(12) United States Patent  (10) Patent No.: US 8,643,479 B1
Donham  (45) Date of Patent: *Feb. 4, 2014

(54) WEARABLE CHARMS FOR USE WITH A WIRELESS CLIENT DEVICE AND METHOD OF USING THE SAME

(71) Applicant: John Donham, Palo Alto, CA (US)

(72) Inventor: John Donham, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,486

(22) Filed: Dec. 27, 2012

Related U.S. Application Data

(63) Continuation of application No. 13/442,154, filed on Apr. 9, 2012, now Pat. No. 8,344,862.

(51) Int. Cl.
*H04B 3/26* (2006.01)

(52) U.S. Cl.
USPC .................. 340/407.1; 340/539.1; 340/573.1; 455/66.1

(58) Field of Classification Search
USPC ................ 340/407.1, 539.1, 573.1; 455/66.1, 455/575.1; 341/20
See application file for complete search history.

(56) References Cited

U.S. PATENT DOCUMENTS

| | | | |
|---|---|---|---|
| 6,218,958 B1 | 4/2001 | Eichstaedt et al. | 340/825.46 |
| 6,965,205 B2 | 11/2005 | Piepgras et al. | 315/318 |
| 7,433,649 B2 | 10/2008 | Toulis et al. | 455/41.2 |
| 7,502,627 B2 | 3/2009 | Sacks et al. | 455/556.1 |
| 7,996,046 B2 | 8/2011 | Vargas et al. | 455/567 |
| 8,344,862 B1* | 1/2013 | Donham | 340/407.1 |
| 2002/0145522 A1* | 10/2002 | Pembroke | 340/573.1 |
| 2004/0207542 A1* | 10/2004 | Chang et al. | 341/20 |
| 2007/0139167 A1 | 6/2007 | Gilson et al. | 340/407.1 |
| 2010/0210323 A1* | 8/2010 | Collins et al. | 455/575.1 |
| 2010/0274902 A1 | 10/2010 | Penman et al. | 709/227 |
| 2011/0221694 A1 | 9/2011 | Karaoguz et al. | 345/173 |

* cited by examiner

*Primary Examiner* — Brent Swarthout
(74) *Attorney, Agent, or Firm* — Pillsbury Winthrop Shaw Pittman LLP

(57) ABSTRACT

The disclosure relates to a tactile messaging system configured to send tactile messages between users. The system may be configured so a first user may input tactile information into a first wearable tactile user device and a second user may receive sensory output from a second tactile user device that corresponds to the tactile information entered by the first user into the first tactile user device. This may allow users to communicate by touch, without having to manually enter electronic input information into the system.

7 Claims, 11 Drawing Sheets

WEARABLE CHARMS FOR USE WITH A WIRELESS CLIENT DEVICE AND METHOD OF USING THE SAME

FIELD

The disclosure relates to a tactile messaging system configured to send tactile messages between users.

BACKGROUND

Devices that communicate sensory output to a user are known. Such devices typically receive user input into an electronic source that generates a signal to communicate the sensory information directly to the sensory output device. User input into an electronic source commonly comprises manually entering electronic input information (typing, pushing one or more buttons, etc.) into a signal generating device. These systems may be limited by the strength of the signal so the signal generating device and the sensory output device must operate in relative proximity to each other.

SUMMARY

One aspect of the disclosure relates to tactile messaging in which users send and/or receive tactile (and/or other sensory) messages through devices that are wearable. The tactile messaging between users may be configured so a first user may input tactile information into a first wearable tactile user device and a second user may receive sensory output from a second tactile user device that corresponds to the tactile input entered by the first user into the first tactile user device. This may allow users to communicate by touch, without having to manually enter electronic input information into the system.

A tactile messaging system implemented to send and/or receive tactile messages between users at devices that are wearable may comprise a first wearable tactile user device, a first wireless client, a server, a second wireless client, and/or a second wearable tactile user device.

Using the system a first user may input tactile information (tapping, rubbing, squeezing, etc.) into a first wearable tactile user device. The user may specify the target of the tactile communication (e.g., one or more other users) and the type of output the target is to receive (e.g., a squeeze, a vibration, a flashing light, a light of a specific color, etc.). Information related to the input by the first user to the first device may be communicated to a first wireless client. The first wireless client may communicate the information related to the input by the first user and/or information determined therefrom to a server. The server may determine tactile input parameters, determine sensory output parameters based on the tactile input parameters, and communicate information related to the sensory output parameters to a second wireless client device related to a second user. The second wireless client device may communicate the information received from the server to a second wearable tactile user device. The second wearable tactile user device may be configured to communicate sensory output to the second user.

The first wearable tactile user device may comprise one or more tactile input sensors, one or more actuators, one or more processors, one or more sensory output devices, and/or other components. The one or more sensory output devices may comprise actuators, light(s), speaker(s), and/or other sensory output components. The tactile input sensors may be configured to generate output signals conveying information related to contact made with the sensors by the first user. For example, the output signals may convey information related to a contact pressure, a contact location, a contact timing, and/or other contact parameters.

The first wireless client may be configured to communicate wirelessly with the first wearable tactile user device, the server, and/or other components of the system. Such communication may include wirelessly receiving information related to the output signals generated by the tactile input sensors. The first wireless client may be configured to transmit the information from the first wearable tactile user device to the server, the second wireless client, the second wearable tactile user device, and/or other devices via one or more wireless communication networks.

The server may be configured to communicate with one or more client computing platforms according to a wireless client, and/or other client computing platforms. In some implementations, the server, the wireless clients, and/or external resources may be operatively linked via one or more electronic communication links. The server may be configured to execute one or more of an input source module, an output target module, a tactile input parameter module, a translation module, a communication module, a user interface module, and/or other modules.

The input source module may be configured to determine the source of communication (e.g., tactile messages) received from the wireless clients and/or the wearable user devices. This may include identifying the first user, the first wearable user device, and/or the first wireless client as the source of information communicated from the first wireless client and/or the first tactile user device. The communication may include information related to tactile input by the first user to the first wearable user device.

The output target module may be configured to determine one or more targets of the tactile message. The one or more targets may be determined based on user configurable settings entered by a user to a wireless client via the user interface of the wireless client. Settings may indicate information related to one or more targets by entering the email address (es) of the target(s) into the user interface, entering the phone number(s) of the target(s) into the user interface, and/or by other methods. A user may configure inputs to a wearable tactile user device (e.g. tap, swipe, etc.) such that they correspond to the output targets. The output target module may determine the target(s) of a tactile message from the entries/associations made by the user.

The output target module may determine one or more targets for the tactile message from the first user based on one or more users having established relationships with the first user in a virtual environment. The output target module may communicate with a wireless client, a server associated with a virtual environment provider, and/or other sources, to obtain information related to established contacts between the first user and other users in a virtual environment (e.g., a Facebook friends list). A user may configure user interface settings such that inputs to a wearable tactile user device (e.g. tap, swipe, etc.) correspond to one or more virtual environment relationships.

The tactile input parameter module may be configured to determine one or more tactile input parameters based on communication from a wireless client and/or from other information. Such communication may include output signals generated by the wearable tactile user device associated with the first user and/or information determined therefrom. Different sets of values for the input parameters may define different tactile inputs.

The translation module may be configured to determine one or more sensory output parameters based on the tactile input parameters, and/or other information. The translation module may be configured to determine the sensory output parameter information for delivery to the second wearable tactile user device. The translation module may be configured to receive information related to the tactile input by the first user to the first wearable tactile user device. Information related to the tactile input by the first user to the first wearable tactile user device may comprise the tactile input parameters determined by the tactile input parameter module, and/or other information. The translation module may be configured to associate the one or more tactile input parameters with one or more sensory output parameters. Different sets of values for the one or more sensory output parameters may define different sensory outputs. The association may be based on information from the input source module, the output target module, the tactile input parameter module, previous user selection and/or configuration of input parameters and/or output parameters effected by the first user and/or the second user through a user interface on a wireless client, and/or other information.

The communication module may be configured to wirelessly transmit output signals related to the sensory output parameter information, the source of the tactile message, and/or other information to the second wireless client and/or the second wearable tactile user device associated with the second user. The delivery of output parameter information may be made directly to the second wearable tactile user device from the server, via the second wireless client associated with the second user, and/or by another method.

The user interface module may be configured to cause a wireless client to present a graphical user interface to a user such that the user may make entries/selections that associate tactile inputs with sensory outputs.

The second wireless client may be configured to communicate wirelessly with the second wearable tactile user device, the server, and/or other components of the system. Such communication may include wirelessly receiving information from the server. The second wireless client may comprise a processor, a user interface, electronic storage, and/or other components. The second wireless client may be configured to transmit the information from the server to the second wearable tactile user device, and/or other devices via one or more wireless communication networks.

The second wearable tactile user device may be configured to communicate sensory output to the second user. The second wearable tactile user device may be configured to communicate sensory output to the second user that corresponds to tactile input by the first user to the first wearable tactile user device. The second wearable tactile user device may comprise one or more tactile input sensors, one or more actuators, one or more processors, one or more sensory output devices, and/or other components. The one or more sensory output devices may comprise actuators, light(s), speaker(s), and/or other sensory output components.

In some implementations, the tactile messaging system may be configured to operate such that the second user may input tactile information into the second wearable tactile user device and the first user may receive sensory output from the first tactile user device that corresponds to the tactile information entered by the second user into second tactile user device. In some implementations, the first wearable tactile user device and the second wearable tactile user device may communicate through server, bypassing the wireless clients. In some implementations, the functionality provided by the server may be implemented by a network cloud of computing platforms operating together. In this configuration, tactile messages may be communicated from one wearable tactile user device to another via the network cloud, bypassing the wireless clients and/or utilizing the wireless clients.

In some implementations, the functionality attributed to the modules described above may be implemented, in part or in total, on one or more other devices within the tactile messaging system. For example, the functionality of one or more of the server modules may be provided by one or more modules being executed on one or more of a processor of the wireless client, a processor of the wearable tactile user device, and/or other processors within the tactile messaging system.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
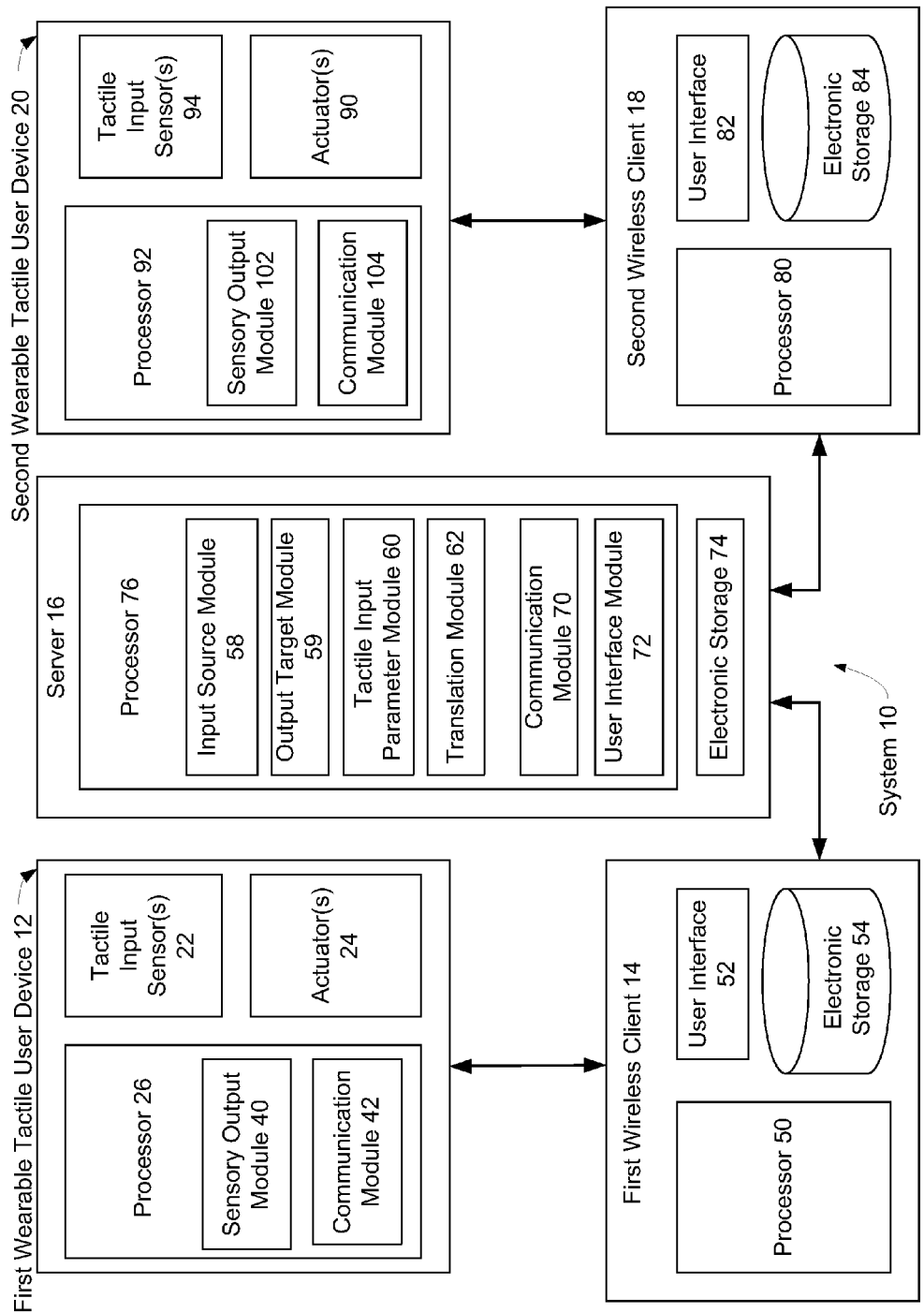
FIG. 1 schematically illustrates a system for sending tactile messages between users.

FIG. 1 illustrates a tactile messaging system 10 configured to send tactile messages between users. System 10 may be configured so a first user may input tactile information into a first wearable tactile user device and a second user may receive sensory output from a second tactile user device that corresponds to the tactile information entered by the first user into the first tactile user device. This may allow tactile communication between users, without having to manually enter electronic input information into system 10. In some implementations, system 10 may comprise a first wearable user device 12, a first wireless client 14, a server 16, a second wireless client 18, a second wearable tactile user device 20, and/or other components.

Using system 10, a first user may input tactile information (tapping, rubbing, squeezing, etc.) into first wearable tactile user device 12. The user may specify the target of the tactile communication (e.g., one or more other users) and the type of output the target is to receive (e.g., a squeeze, a vibration, a flashing light, a light of a specific color, etc.). Wearable tactile user device 12 may be configured to wirelessly transmit output signals conveying information related to the tactile input to first wireless client 14. First wireless client 14 may be configured to wirelessly transmit information conveying the output signals to second wireless client 18 via server 16. Server 16 may be configured to translate the information related to the tactile input to sensory output information. Second wearable tactile user device 20 may be configured to receive wireless communication from second wireless client 18 that causes a processor of second wearable tactile user device 20 to control one or more actuators and/or other devices to provide feedback to the second user. The feedback to the second user may correspond to the tactile input provided to first wearable tactile user device 12 by the first user.

First wearable user device 12 may be configured to accept tactile input from the first user and to wirelessly output tactile information signals conveying information related to the received tactile input. First wearable tactile user device 12 may comprise one or more tactile input sensors 22, one or more actuators 24, one or more processors 26, a GPS device, one or more sensory output devices, and/or other components. The one or more sensory output devices may comprise actuators 24, light(s), speaker(s), and/or other sensory output components.

In some implementations, the form factor of first wearable user device 12 may be a wearable accessory such as a bracelet, a wristband, or other form factor. First wearable user device 12 may be configured with one or more contiguous surfaces. For example, a bracelet may have and inner contiguous surface and an outer contiguous surface. In some implementations, the one or more contiguous surfaces may be flexible. In some implementations, the components of first wearable user device 12 listed above and/or other components may be formed in the one or more contiguous surfaces of first wearable user device 12. In some implementations, the one or more surfaces and/or areas within the one or more surfaces may be piezoelectric surfaces. In some implementations, the one or more surfaces and/or areas within the one or more surfaces may be capacitive surfaces. In some implementations, the form factor of first wearable user device 12 is not configured to be a keypad, a keyboard, and/or a device where entries are keyed in.

Figure 2:
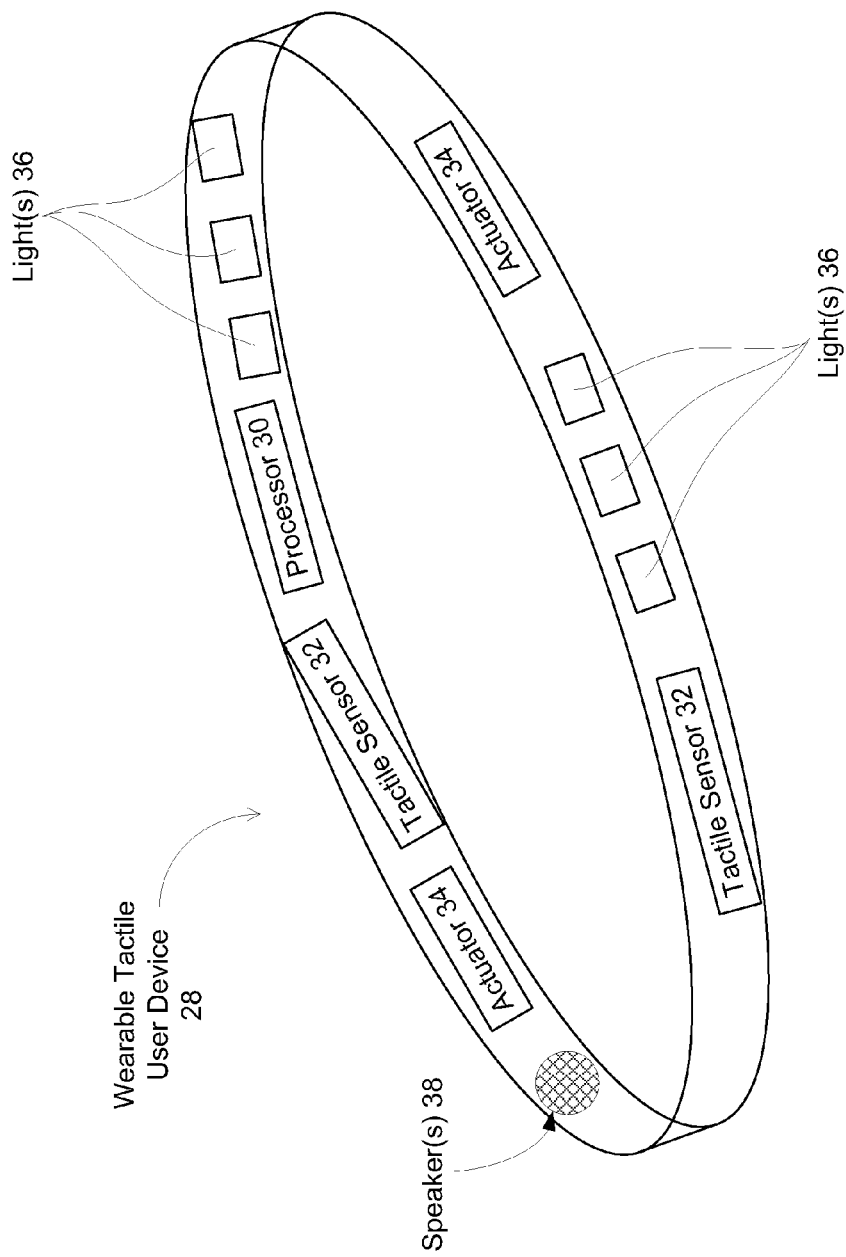
FIG. 2 illustrates one example implementation of a wearable tactile user device.

By way of a non-limiting example, a wearable tactile user device 28 is illustrated in FIG. 2. Wearable tactile user device 28 of FIG. 2 may be configured to be worn by a user as a bracelet and may comprise a processor 26, tactile sensor(s) 32, actuator(s) 34, sensory output components, and/or other components. Sensory output components may comprise actuator(s) 34, light(s) 36, speaker(s) 38, and/or other sensory output components.

Returning to FIG. 1, first wearable tactile user device 12 may be configured such that the first user may identify the target of the tactile message and/or compose the tactile message by the way the user touches tactile sensors 22 on first wearable tactile user device 12.

First wearable tactile user device 12 may be configured such that the output signals generated by first wearable tactile user device 12 may indicate information related to one or more contact parameters of the input by the first user. The one or more contact parameters may include one or more of tactile pressure on the first device, the location of the pressure on the first device, the timing of the pressure on the first device, and/or other parameters. The output signals generated by first wearable tactile user device 12 may convey information related to a unique identification associated with the first wearable tactile user device (e.g., identification of a specific individual user), location of the user (e.g., GPS determined user location), time of day (determined by the processor, for example), message urgency (e.g., for an emergency message to a local emergency service), and/or other information. First tactile user device 12 may be configured to wirelessly transmit the output signals to first wireless client 14 associated with the first user, to server 16, to wireless client 18 associated with a second user, directly to second wearable tactile user device 20, and or to other devices. In some implementations, first tactile user device 12 may be configured to communicate with first wireless client 14 directly via Bluetooth, a direct wireless connection, via a wireless network, and/or through other communication media.

One or more tactile input sensors 22 may be configured to generate output signals conveying information related to the input by the first user to wearable tactile user device 12. Such information may include one or more contact parameters of a tactile input by the first user. Tactile input may comprise touching, squeezing, rubbing, tapping, and/or other tactile input. Tactile input sensors 22 may comprise sensors disposed in a plurality of locations in the wearable tactile user device. In some implementations tactile input sensors 22 may comprise one or more touchscreens, one or more pressure transducers, a pressure sensor array, one or more strain gauge rosettes, and/or other sensors.

Processor 26 may be configured to provide information processing capabilities in wearable tactile user device 12. As shown in FIG. 1, processors 26, may be configured to execute one or more computer program modules. The one or more computer program modules may comprise one or more of a sensory output module 40, a communication module 42, and/or other modules.

Communication module 42 may be configured to communicate information related to the output signals of tactile input sensors 22, and/or information derived therefrom to first wireless client 14, server 16, second wireless client 18, another wearable tactile user device (e.g., wearable tactile user device 20), and/or another component of system 10. Information related to the output signals of tactile input sensors 22 may comprise information related to tactile contact parameters of the input by the first user to wearable tactile user device 12, and/or other information.

First wireless client 14 may be configured to communicate wirelessly with first wearable tactile user device 12, server 16, and/or other components of system 10. Such communication may include wirelessly receiving information related to the output signals generated by tactile input sensors 22. First wireless client 14 may comprise a processor 50, a user interface 52, electronic storage 54, and/or other components. First wireless client 14 may be configured to transmit the information conveying the output signals related to the contact parameters to server 16, second wireless client 18, second wearable tactile user device 20, and/or other devices via one or more wireless communication networks (e.g., the internet, cell phone network, etc.).

Server 16 may be configured to communicate with one or more client computing platforms (e.g., wireless client 14, wireless client 18) according to a wireless clients 14 and/or 18, and/or other client computing platforms. In some implementations, server 16, wireless clients 14, 18, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 16, wireless clients 14, 18, and/or external resources may be operatively linked via some other communication media. Server 16 may comprise processor 76, electronic storage 74, and/or other components.

Processor 76 of server 16 may be configured to execute one or more computer program modules. The computer program modules may include one or more of an input source module 58, an output target module 59, a tactile input parameter module 60, a translation module 62, a communication module 70, a user interface module 72, and/or other modules.

Input source module 58 may be configured to determine the source (e.g. a device related to a specific user such as first wearable tactile user device 12, wireless client 14, and/or other devices) of the contact parameter information related to tactile input by a user to a wearable user device. Input source module 58 may determine the source of the tactile input based on output signals from a wearable tactile user device (e.g., first wearable tactile user device 12), based on information included in communications with wireless client device 14 (e.g., MAC address and/or other identifying information), from information entered by a user to a wireless client (e.g. first wireless client 14) via a user interface (e.g., 52), and/or by other methods.

Output target module 59 may be configured to determine the target (e.g. one or more devices related to one or more specific users such as second wearable tactile user device 20 related to the second user, wireless client 18 related to the second user, and/or other devices related to other users) of the tactile message. Output target module 59 may determine the target of the tactile message based on output signals from a wearable tactile user device (e.g., first wearable tactile user device 12), information communicated from a wireless client (e.g., 14) to a server (e.g., 16) from information stored in a wireless client (e.g., a contact list), from information entered by a user to a wireless client (e.g. first wireless client 14) via a user interface (e.g., 52), and/or by other methods. In some implementations, output target module 59 may determine the target of a tactile message to be a local emergency service (e.g., 911).

Output target module 59 may determine one or more targets (e.g., other users) for delivery of a tactile message. The one or more targets may be determined based on user configurable settings entered by a user to a wireless client (e.g., 14) via a user interface (e.g., 52). Settings may indicate information related to one or more targets by entering the email address(es) of the target(s) into a user interface (e.g. 52), entering the phone number(s) of the target(s) into the user interface, and/or by other methods. A user may pre-select and/or pre-associate inputs to a wearable tactile user device (e.g. tap, swipe, etc.) that correspond to the output targets. Output target module 59 may determine the target(s) of a tactile message from the entries/associations made by the user.

For example, the first user may pat tactile input sensors on first wearable tactile user device 12 to identify a first target user and/or a first target group of users, and rub the sensors to identify a second target user and/or second target group of users.

Output target module 59 may determine one or more targets for the tactile message from the first user based on one or more users having established relationships with the first user in a virtual environment. Output target module 59 may communicate with a wireless client (e.g., 14), a server associated with a virtual environment provider, and/or other sources, to obtain information related to established contacts between the first user and other users in a virtual environment (e.g., a Facebook friends list). A user may configure user interface settings such that inputs to a wearable tactile user device (e.g. tap, swipe, etc.) correspond to one or more virtual environment relationships.

The virtual environment may comprise one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

Output target module 59 may be implemented on server 16, a processor (e.g., 50, 80) of a wireless client (e.g. 14, 18) and/or on a processor (e.g., 26, 92) of a wearable tactile user device (e.g., 12, 20).

Tactile input parameter module 60 may be configured to determine one or more tactile input parameters based on communication from wireless client 14 and/or from other information. Such communication may include output signals generated by wearable tactile user device 12 associated with the first user and/or information determined therefrom.

Different sets of values for the input parameters may define different tactile inputs. Tactile input parameter module 60 may be configured to receive information related to tactile input by the first user to first wearable tactile user device 12. Information related to tactile input by the first user to first wearable tactile user device 12 may comprise output signals from wearable tactile user device 12, information entered by a user to a wireless client (e.g. first wireless client 14) via a user interface (e.g., 52), and/or other information. Tactile input parameter module 60 may receive information communicated directly from first wearable user device 12, from first wireless client 14, and/or from another source.

Tactile input parameters may comprise tactile input pressure, the timing of the tactile input pressure, the location of the tactile input pressure, and/or other parameters. Tactile input parameter module 60, may be configured to determine tactile input parameters based on a single touch, a pattern of touches, and/or other tactile input to first wearable tactile user device 12. The information determined by tactile input parameter module 60 may be translated by translation module 62, and/or used for other uses.

Translation module 62 may be configured to determine one or more sensory output parameters based on the tactile input parameters, and/or other information. Translation module 62 may be configured to determine the sensory output parameter information for delivery to second wearable tactile user device 20. Translation module 62 may be configured to receive information related to the tactile input by the first user to first wearable tactile user device 12. Information related to the tactile input by the first user to first wearable tactile user device 12 may comprise the tactile input parameters determined by tactile input parameter module 60, and/or other information. Translation module 62 may be configured to associate the one or more tactile input parameters with one or more sensory output parameters. Different sets of values for the one or more sensory output parameters may define different sensory outputs. The association may be based on information from input source module 66, output target module 68, tactile input parameter module 60, previous user selection and/or configuration of input parameters and/or output parameters effected by the first user and/or the second user through a user interface (e.g., 52, 82) on a wireless client (e.g., 14, 18), and/or other information.

The one or more sensory output parameters may be determined by translation module 62 based on information entered by the user to first wireless client 14 via user interface 52, second wireless client 18 via user interface 82, and/or other methods. Sensory output parameters may comprise a tactile pressure, the location of the tactile pressure, the timing of the tactile pressure, and/or other output parameters. For example, translation module 62 may translate information indicating a series of taps input to first wearable tactile user device 12 to information indicating a squeeze to be output from second wearable tactile user device 20.

In some implementations, the functionality attributed herein to translation module 62 may be implemented, in part or in total, on one or more modules being executed on one or more other devices within system 10. For example, such functionality may be provided one or more modules being executed on one or more of a processor of the wireless client (e.g., 14, 18), a processor of the wearable tactile user device (e.g., 12, 20), and/or other processors within system 10.

Communication module 70 may be configured to wirelessly transmit output signals related to the sensory output parameter information, the source of the tactile message, and/or other information to second wearable tactile user device 20 associated with the second user. The delivery of output parameter information may be made directly to second wearable tactile user device 20 from server 16, via wireless client 18, and/or by another method.

User interface module 72 may be configured to cause a wireless client (e.g., 14, 18) to present a graphical user interface to a user. The graphical user interface may be presented, for example, through a website, through a webpage, through a dedicated mobile application (e.g., an "app"), and/or through other mechanisms on wireless client 14 and/or 18. The graphical user interface may be configured to receive entry and/or selection by the first and/or second user of associations of one or more input parameters with one or more output parameters. The graphical user interface may be configured to present one or more views to a user. Each view may comprise one or more fields. The one or more fields may comprise one or more user selectable areas for entry and/or selection of one or more parameters and/or other information. The parameters may be related to tactile input by a first user to a first wearable tactile user device (e.g., 12), sensory output to one or more other users wearing another wearable tactile user device (e.g., 20), and/or other information. The one or more fields may be configured such that a user may enter information into a field directly by typing and/or other methods of directly inputting information. The one or more fields may be configured to present a list of possible parameters for selection by the user.

User interface module 72 may be configured to pre-populate one or more fields with the list of possible parameters for selection by the user. User interface module 72 may determine the contents of a list of possible parameters from a user's pre-existing relationships in a virtual space, a user's contact list stored on a wireless client device (e.g., 14), previous entries by a user to a user interface (e.g., 52), and/or by other methods. In some implementations, pre-populated input fields determined by user interface module 72 may change based on the user, the target of the tactile message, the model of the wearable tactile user device, and/or other factors. In some implementations, pre-populated output fields determined by interface module 72 may change based on the user, the tactile message sender, the model of the wearable tactile user device and/or other factors.

The one or more views presented to the first user may comprise a tactile input/sensory output view, a tactile input/tactile message target view, and/or other views. In the tactile input/sensory output view the first user may select a distinct tactile input (e.g., tapping, rubbing, pressing, etc.) via one or more tactile input field(s). The user may associate the distinct tactile input with a distinct sensory output (e.g., a squeeze, light of a specific color, a sound, etc.) for delivery to another user by selecting a corresponding sensory output from a sensory output field. The user may select the target of the tactile message via a tactile message target field.

In the tactile input/tactile message target view the first user may select a distinct tactile input type (e.g., tapping, rubbing, pressing, etc.) via one or more tactile input type fields. The user may associate the distinct tactile input with a distinct tactile input location (e.g., inside, outside, etc.) on the wearable tactile user device via one or more location fields. The user may associate the tactile input and the tactile input location with a target of the tactile message (e.g., another user) via a tactile message target field.

The one or more views presented to the second user may comprise a tactile message source/sensory output view, and/or other views. In the tactile message source/sensory output view the second user may configure sensory output based on the source (e.g., the first user) of the tactile message. The second user may associate specific tactile input (e.g., tapping, rubbing, squeezing, etc.) from a specific tactile message source (e.g., the first user) with specific sensory output (a squeeze, lights, a sound, etc) for each tactile input. The second user may select a tactile message source from a tactile message source field. The second user may associate a specific tactile input selected from a tactile input field with a specific sensory output from a corresponding sensory output field. The second user may customize each tactile input/sensory output association for various tactile message sources (e.g., different users).

By way of a non-limiting example, the first user may configure user interface settings via user interface 52 such that a series of taps at a specific location on wearable tactile user device 12 outputs a squeeze from another wearable tactile user device (e.g., wearable tactile user device 20) to another user. The first user may configure settings via user interface 52 such that the user may pat the tactile sensors to identify a first target for delivery of the tactile message, and rub the sensors to identify a second target. The first user may configure settings via user interface 52 such that the first user may pat a specific section of first wearable tactile user device 12 to identify the first target, and pat a different section of first wearable tactile user device 12 to identify the second target. By way of a second non-limiting example the recipient user may configure settings via user interface 82, for example, such that a tap sent by a first message source outputs a tap to the recipient user. The user may configure settings such that a tap sent by a second message source outputs a squeeze to the recipient user.

Second wireless client 18 may be configured to communicate wirelessly with second wearable tactile user device 20, server 16, and/or other components of system 10. Such communication may include wirelessly receiving information related to the output signals generated by server 16. Second wireless client 18 may comprise a processor 80, a user interface 82, electronic storage 84, and/or other components. Second wireless client 18 may be configured to transmit the information conveying the output signals to second wearable tactile user device 20, and/or other devices via one or more wireless communication networks (e.g., Bluetooth, the internet, cell phone network, etc.).

Second wearable tactile user device 20 may be configured to communicate sensory output to the second user. Second wearable tactile user device 20 may be configured to communicate sensory output to the second user that corresponds to tactile input by the first user to first wearable tactile user device 12. Sensory output may comprise a squeeze, lighting, sounds, vibrations, and/or other sensory output.

Second wearable tactile user devices 20 may comprise one or more tactile input sensors 94, one or more actuators 90, one or more processors 92, one or more sensory output devices, and/or other components. The one or more sensory output devices may comprise actuators 24, light(s), speaker(s), and/or other sensory output components.

Actuators 90 may be configured to provide tactile output to the second user (wearing the tactile user device) that corresponds to tactile input by the first user to first wearable tactile user device 12. Tactile output may comprise a squeeze, a vibration, and/or other tactile output. Actuators 90 may comprise actuators disposed in a plurality of locations in wearable tactile user device 20.

Processor 92 may be configured to control one or more actuators 90 to provide tactile output to the second user that corresponds to the tactile input provided to first wearable tactile user device 12 by the first user.

Processor 92 may be configured to provide information processing capabilities in wearable tactile user device 20. As shown in FIG. 1, processor 92 may be configured to execute one or more computer program modules. The one or more computer program modules may comprise one or more of a sensory output module 102, a communication module 104, and/or other modules.

Sensory output module 102 may be configured to control one or more actuators 90, light(s), a speaker, and/or other sensory output devices to provide sensory output to the user that corresponds to the tactile input provided to first wearable tactile user device 12 by the first user.

Communication module 104 may be configured to receive information related to output signals from first wearable tactile user device 12 related to tactile input to first wearable tactile user device 12 by the first user. The information received by communication module 104 may be communicated from first wireless client 14, server 16, second wireless client 18, another wearable tactile user device (e.g., first wearable tactile user device 12), and/or another component of system 10.

As shown in FIG. 1, system 10 may be configured to operate such that the second user may input tactile information into second wearable tactile user device 20 and the first user may receive sensory output from first tactile user device 12 that corresponds to the tactile information entered by the second user into second tactile user device 20. As such, the functionality described above for first wearable tactile user device 12 and/or first wireless client 14 may apply to second wearable tactile user device 20 and/or second wireless client 18. The functionality described above for second wearable tactile user device 20 and/or second wireless client 18, may apply to first wearable tactile user device 12 and/or first wireless client 14.

Server 16 has been described above to function such that a tactile message from a first user entered into first wearable tactile user device 12 is translated and/or transmitted to a second user via second wearable tactile user device 12. It is to be understood that server 16 operates in substantially the same manner to translate and/or transmit a tactile message from second wearable tactile user device 20 to first wearable tactile user device 12.

The description of tactile communication in the present disclosure from a first user to a second user and/or from a second user to a first user is not intended to be limiting. System 10 may comprise three or more users (third device not shown in FIG. 1) communicating back and forth with each other individually and/or as a group. In some implementations, system 10 may be configured to send an emergency message to a local emergency service. For example, a user may interact with a wearable tactile user device to indicate an emergency. Responsive to this interaction, the wearable tactile user device may generate output signals indicating information related to the location of the user, the time of day, the urgency of the message, and/or other information. The emergency message may then be communicated directly to the emergency service from the wearable user device, from a wireless client, from the server, and/or from one of the other components of system 10 as described above.

As shown in FIG. 1, first and second wearable tactile user devices 12 and 20 may be configured with similar components. In some implementations, Processors 26 and/or 92 may be configured to execute modules (40, and/or 42 in processor 26, modules 102, 104 in processor 92) by software, hardware, firmware, some combination of software, hardware, and/or firmware, and/or other mechanisms for configuring processing capabilities on processors 26 and/or 92.

It should be appreciated that although modules 40, and 42, and 102, and 104 are illustrated in FIG. 1 as being co-located within their own single processing unit, in implementations in which processors 26 and/or 92 each comprise multiple processing units, one or more of modules 40, and/or 42 (processor 26) and/or modules 102, and/or 104 (processor 92) may be located remotely from the other modules. The description of the functionality provided by the different modules described herein is for illustrative purposes, and is not intended to be limiting, as any of modules 40, and/or 42 (processor 26) and/or modules 102, and/or 104 (processor 92) may provide more or less functionality than is described. For example, one or more of modules 40, and/or 42 (processor 26) and/or modules 102, and/or 104 (processor 92) may be eliminated, and some or all of its functionality may be provided by other modules 40, and/or 42 (processor 26) and/or modules 102, and/or 104 (processor 92). As another example, processor 26 and/or 92 may be configured to execute one or more additional modules that may perform some or all of the functionality attributed to one of modules 40, and/or 42 (processor 26) and/or modules 102, and/or 104 (processor 92).

As shown in FIG. 1, first and second wireless clients 14 and 18 may be configured with similar components. In some implementations, user interface 52, 82 may be configured to provide an interface between wireless client 14, 18 and the user through which the user may provide information to and receive information from wireless client 14, 18. This enables data, cues, results, and/or instructions and any other communicable items, collectively referred to as "information," to be communicated between the user and wireless client 14, 18, and/or other components of system 10. Examples of interface devices suitable for inclusion in user interface 52, 82 comprise a touch screen, a keypad, buttons, switches, a keyboard, knobs, levers, a display screen, speakers, a microphone, an indicator light, an audible alarm, a printer, and/or other interface devices. In one implementation, user interface 52, 82 comprises a plurality of separate interfaces. In one implementation, user interface 52, 82 comprises at least one interface that is provided integrally with wireless client 14, 18.

It is to be understood that other communication techniques, either hard-wired or wireless, are also contemplated by the present disclosure as user interface 52, 82. For example, the present disclosure contemplates that user interface 52, 82 may be integrated with a removable storage interface provided by electronic storage 54, 84. In this example, information may be loaded into wireless client 14, 18 from removable storage (e.g., a smart card, a flash drive, a removable disk, etc.) that enables the first user to customize the implementation of wireless client 14, 18. Other exemplary input devices and techniques adapted for use with wireless client 14, 18 as user interface 52, 82 comprise, but are not limited to, an RS-232 port, RF link, an IR link, modem (telephone, cable or other). In short, any technique for communicating information with wireless client 14, 18 is contemplated by the present disclosure as user interface 52, 82.

Electronic storage 54, and/or 84 may be configured to store the entries and/or selections by the user of the associations of the one or more input parameters with the one or more output parameters entered via user interface 52, 82. The stored associations may be accessed by processor 50, 80 each time wireless client 14, 18 receives information related to tactile input made by the user to wearable tactile user device 12, 20, and/or at other times.

In some implementations, electronic storage 54 of first wireless client 14 and/or electronic storage 84 of second wireless client 18 may comprise electronic storage media that electronically stores information in system 10. Electronic storage 54, 84 may be configured to store software algorithms, information determined by a processor 26, 50, 80, 92, information received via user interface 52, 82, and/or other information that enables system 10 to function properly. The electronic storage media of electronic storage 54, 84 may comprise one or both of system storage that is provided integrally (i.e., substantially non-removable) with one or more components of system 10 and/or removable storage that is removably connectable to one or more components of system 10 via, for example, a port (e.g., a USB port, a firewire port, etc.) or a drive (e.g., a disk drive, etc.). Electronic storage 54, 84 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 54, 84 may be (in whole or in part) a separate component within one or more components of system 10, or electronic storage 54, 84 may be provided (in whole or in part) integrally with one or more other components of system 10 (e.g., user interface 52, 82, etc.).

In some implementations, wireless clients 14,18 may include one or more processors (e.g., 50, 80) configured to execute computer program modules. Processors 50, 80 may be configured to provide information processing capabilities in wireless clients 14, 18. Processor 50, 80 may be configured to process information by software; hardware; firmware; some combination of software, hardware, and/or firmware; and/or other mechanisms for configuring processing capabilities on processor 50, 80. Processors 50, 80 may be configured to execute computer program modules to ensure proper operation of wireless clients 14 and/or 18. The computer program modules may be configured to enable an expert or user associated with the given wireless clients 14, 18 to interface with system 10 and/or external resources, and/or provide other functionality attributed herein to wireless clients 14, 18. By way of non-limiting example, wireless clients 14, 18, may include one or more of a desktop computer, a laptop computer, a handheld computer, a tablet computing platform, a NetBook, a Smartphone, a gaming console, and/or other computing platforms.

The external resources may include sources of information, hosts and/or providers of virtual environments outside of system 10, external entities participating with system 10, and/or other resources. In some implementations, some or all of the functionality attributed herein to the external resources may be provided by resources included in system 10.

Server 16 may include electronic storage 74, one or more processors 76, and/or other components. Server 16 may include communication lines, or ports to enable the exchange of information with a network and/or other computing platforms. Illustration of server 16 in FIG. 1 is not intended to be limiting. Server 16 may include a plurality of hardware, software, and/or firmware components operating together to provide the functionality attributed herein to server 16. For example, server 16 may be implemented by a cloud of computing platforms operating together as server 16.

Electronic storage 74 may comprise electronic storage media that electronically stores information. The electronic storage media of electronic storage 74 may include one or both of system storage that is provided integrally (i.e., substantially non-removable) with server 16 and/or removable storage that is removably connectable to server 16 via, for example, a port (e.g., a USB port, a firewire port, etc.) or a drive (e.g., a disk drive, etc.). Electronic storage 74 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 74 may include one or more virtual storage resources (e.g., cloud storage, a virtual private network, and/or other virtual storage resources). Electronic storage 74 may store software algorithms, information determined by processor 76, information received from server 16, information received from client computing platforms (e.g., wireless client 14, 18), and/or other information that enables server 16 to function as described herein.

Processor(s) 76 is configured to provide information processing capabilities in server 16. As such, processor 76 may include one or more of a digital processor, an analog processor, a digital circuit designed to process information, an analog circuit designed to process information, a state machine, and/or other mechanisms for electronically processing information. Although processor 76 is shown in FIG. 1 as a single entity, this is for illustrative purposes only. In some implementations, processor 76 may include a plurality of processing units. These processing units may be physically located within the same device, or processor 76 may represent processing functionality of a plurality of devices operating in coordination. The processor 76 may be configured to execute modules 58, 59, 60, 62, 70, and/or 72. Processor 76 may be configured to execute modules 58, 59, 60, 62, 70, and/or 72 by software; hardware; firmware; some combination of software, hardware, and/or firmware; and/or other mechanisms for configuring processing capabilities on processor 76.

It should be appreciated that although modules 58, 59, 60, 62, 70, and/or 72 are illustrated in FIG. 1 as being co-located within a single processing unit, in implementations in which processor 76 includes multiple processing units, one or more of modules 58, 59, 60, 62, 70, and/or 72 may be located remotely from the other modules. The description of the functionality provided by the different modules 58, 59, 60, 62, 70, and/or 72 described herein is for illustrative purposes, and is not intended to be limiting, as any of modules 58, 59, 60, 62, 70, and/or 72 may provide more or less functionality than is described. For example, one or more of modules 58, 59, 60, 62, 70, and/or 72 may be eliminated, and some or all of its functionality may be provided by other ones of modules 58, 59, 60, 62, 70, and/or 72. As another example, processor 76 may be configured to execute one or more additional modules that may perform some or all of the functionality attributed below to one of modules 58, 59, 60, 62, 70, and/or 72.

Figure 3:
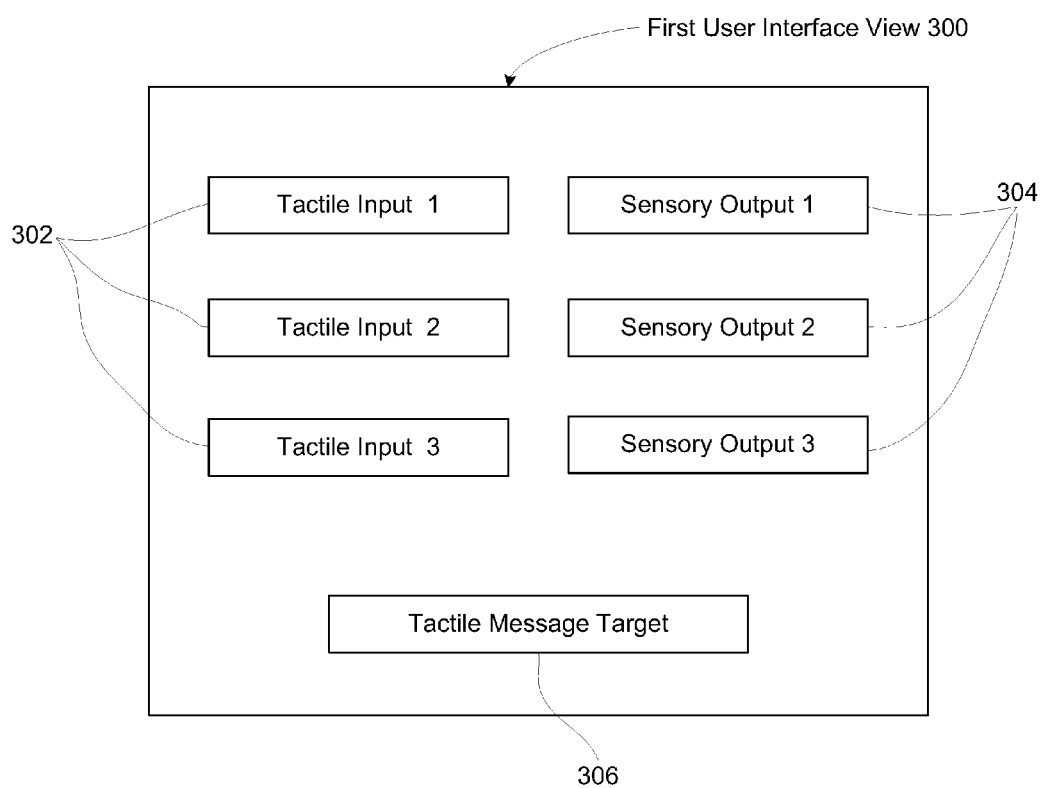
FIG. 3 depicts a view of a user interface of a wireless client associated with the source of the tactile message.

FIG. 3 depicts a view 300 of a wireless client user interface. Through the user interface, a user may associate different sets of values representing input parameters with different sets of values representing output parameters. One or more input parameters may define a user input (e.g., a tap, a swipe, a squeeze). One or more sensory output parameters may define an output (e.g., a squeeze, a flashing light, a sound). In view 300 a user (e.g., a user who is the source of the tactile message and/or another user who is the recipient of the message) may select a distinct tactile input (e.g., tapping, rubbing, pressing, etc.) via one or more tactile input field(s) 302. The user may associate the distinct tactile input with a distinct sensory output (e.g., a squeeze, light of a specific color, a sound, etc.) for delivery to another user by selecting a corresponding sensory output from one of the sensory output fields 304. The user may select the target of the tactile message via a tactile message target field 306.

Figure 4:
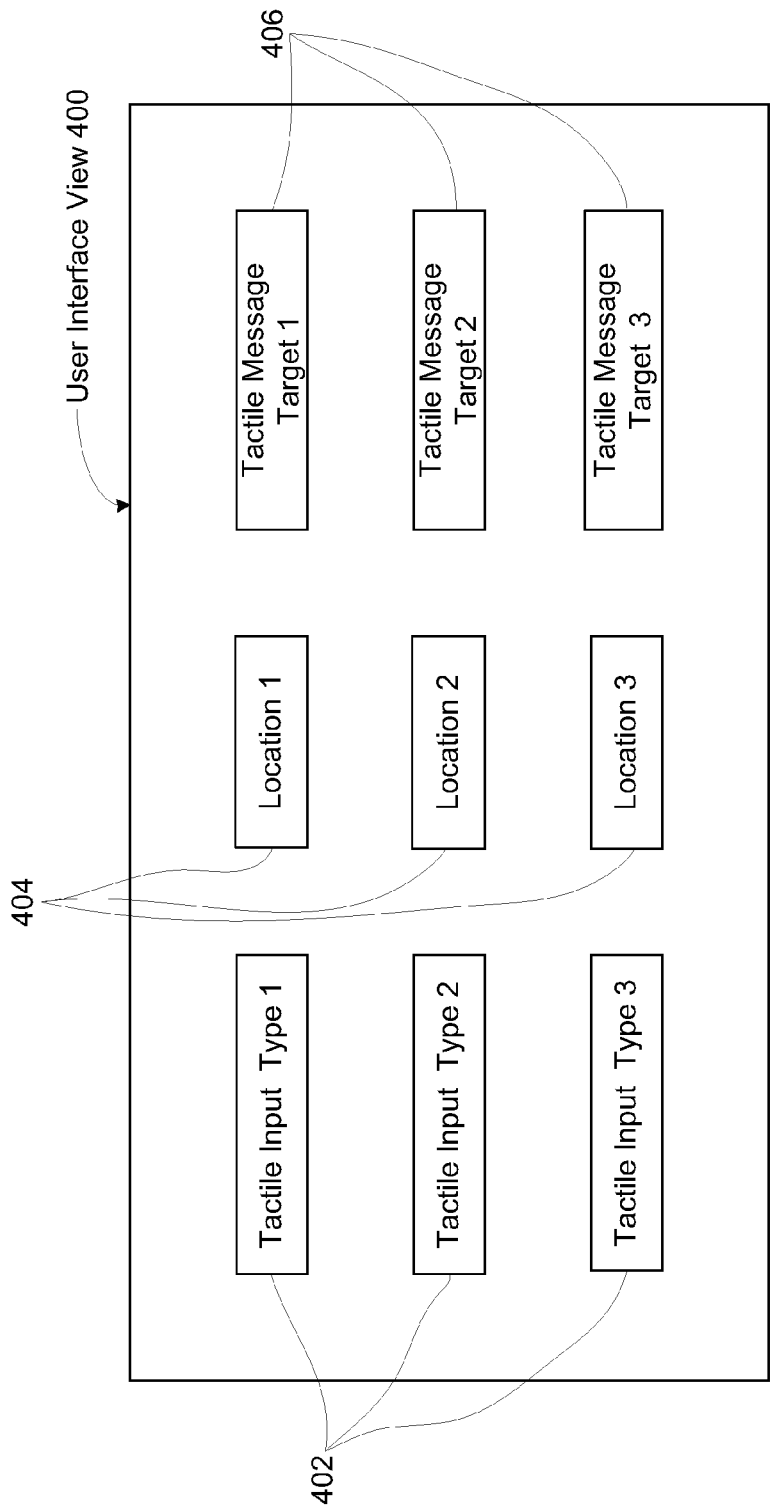
FIG. 4 depicts a different view of a user interface of a wireless client associated with the source of the tactile message.

FIG. 4 shows a view 400 of a wireless client user interface. A user may associate different sets of values representing input parameters (e.g., one set that represents the type of tactile input and one set that represents the tactile input location) with different sets of values representing output parameters (e.g., the target of the tactile message). In view 400 a user may select a distinct tactile input type (e.g., tapping, rubbing, pressing, etc.) via one or more tactile input type field(s) 402. The user may associate the distinct tactile input with a distinct tactile input location (e.g., inside, outside, etc.) on the wearable tactile user device via location field(s) 404. The user may associate the tactile input and the tactile input location with a target of the tactile message (e.g., another user) via a tactile message target field 406 so the tactile message is delivered to the intended target.

Figure 5:
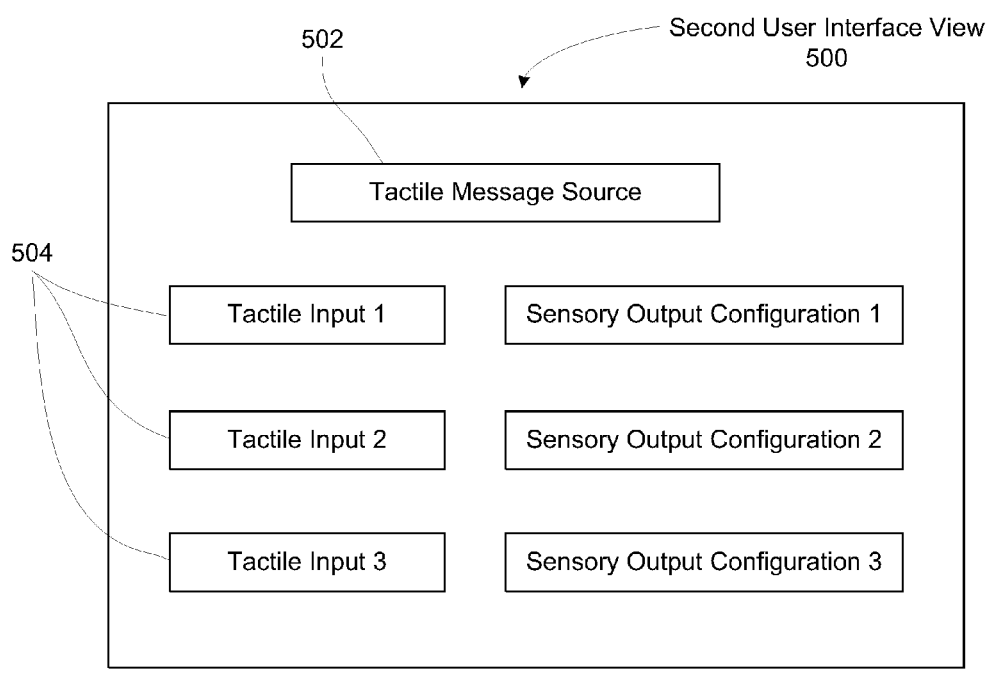
FIG. 5 depicts a view of a user interface of a wireless client associated with the recipient of the tactile message.

By way of illustration, FIG. 5 depicts a view 500 of a user interface. In view 500 a user may configure sensory output with specific tactile input (e.g., tapping, rubbing, squeezing, etc.) from a tactile message source (e.g., a specific user). The user may select a tactile message source from a tactile message source field 502. The user may associate a specific tactile input selected from tactile input fields 504 with a specific sensory output from the corresponding sensory output field 506. The user may customize each tactile input/sensory output association for various tactile message sources (e.g., different users). For example, the user may configure a tap sent by a second message source to output a tap to the user. The user may configure a tap sent by a third message source to output a squeeze to the user.

Figure 6:
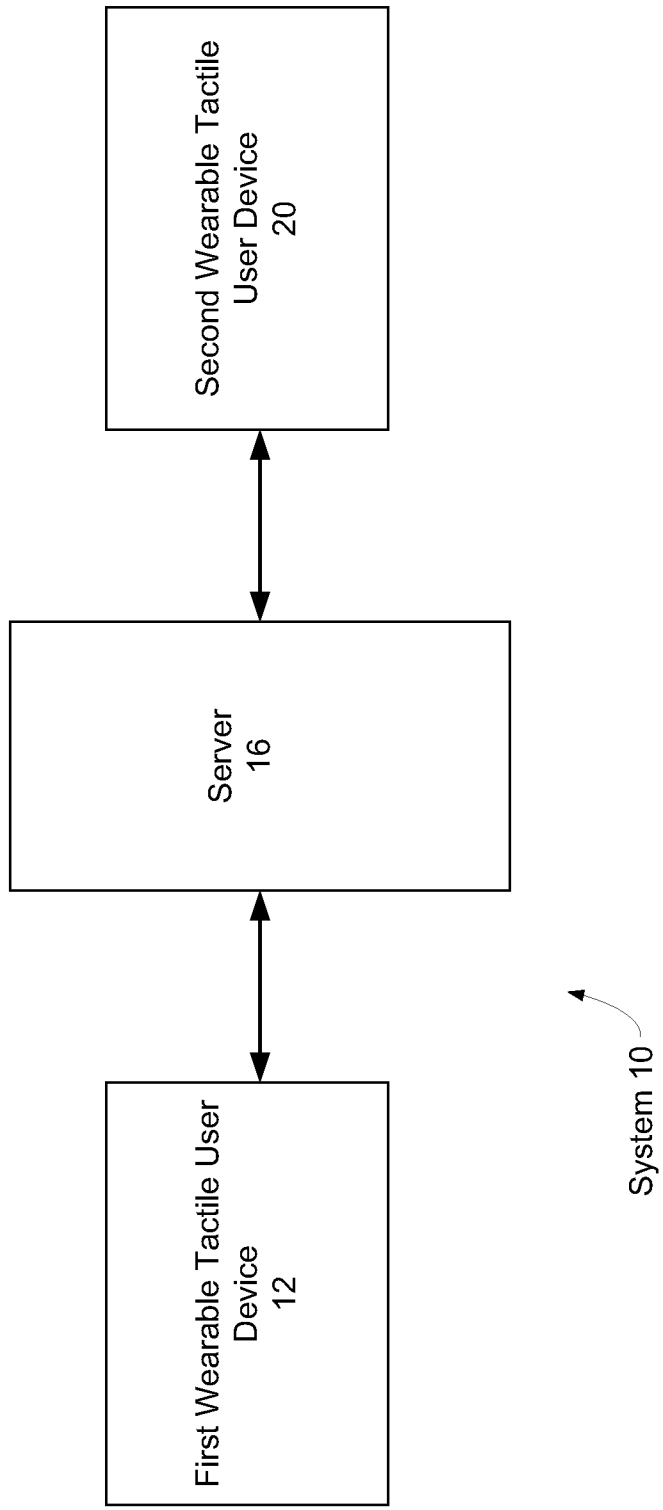
FIG. 6 schematically illustrates another implementation of the system for sending tactile messages between users.

FIG. 6 describes an alternate configuration of system 10. In this configuration, first wearable tactile user device 12 and second wearable tactile user device 20 communicate through server 16. The functionality provided by wireless client 14 and/or wireless client 18 shown in FIG. 1 is performed by first wearable tactile user device 12, server 16, and/or second wearable tactile user device 20 in this configuration.

Figure 7:
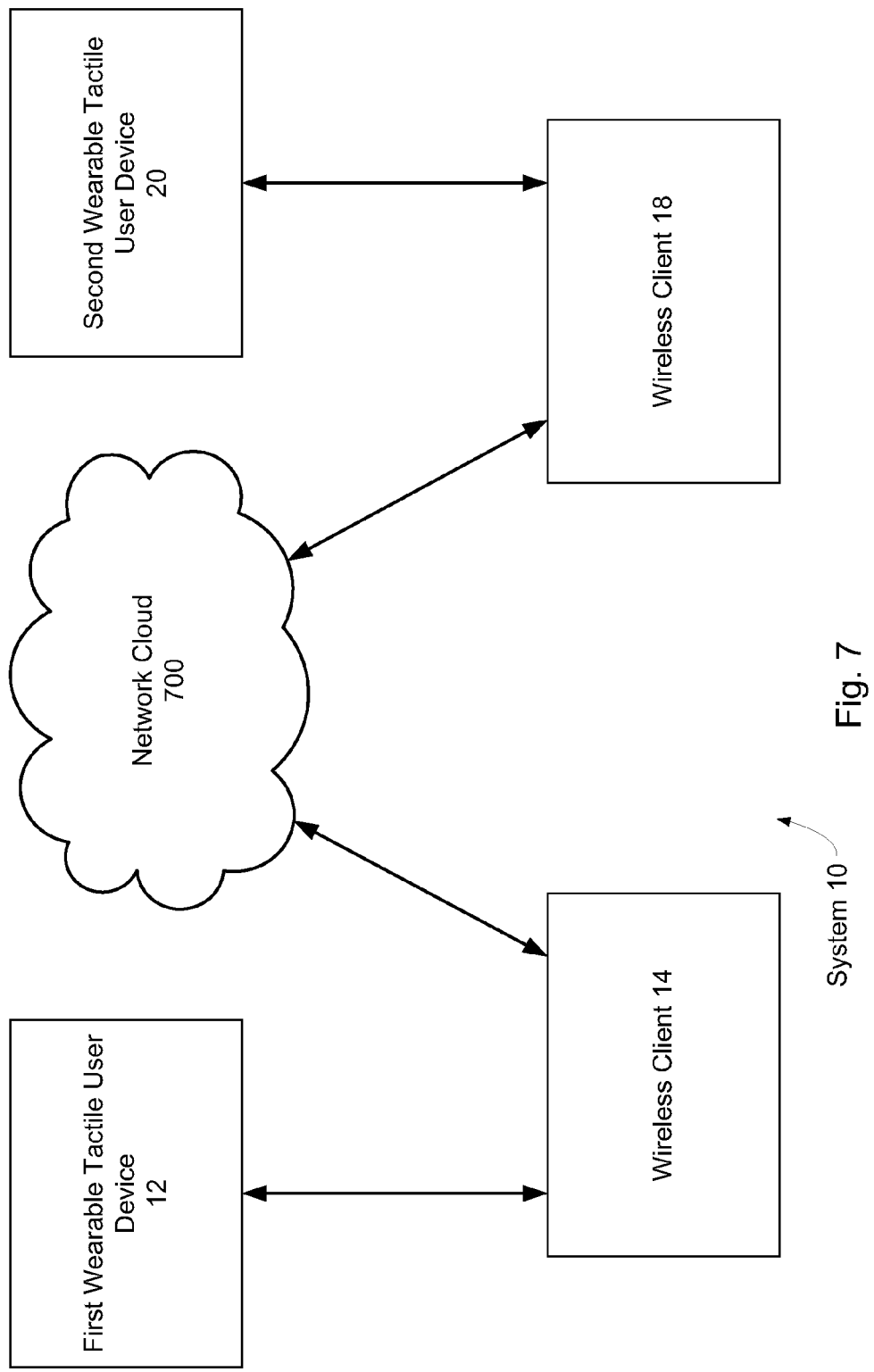
FIG. 7 schematically illustrates a third implementation of the system for sending tactile messages between users.

FIG. 7 describes another alternate configuration of system 10. In this configuration the functionality provided by a server (e.g., server 16 shown in FIG. 1) may be implemented by a network cloud 700 of computing platforms operating together. In this configuration, tactile messages are communicated from one wearable tactile user device (e.g., 12) to another (e.g., 20) via wireless clients 14, 18, and network cloud 700.

Figure 8:
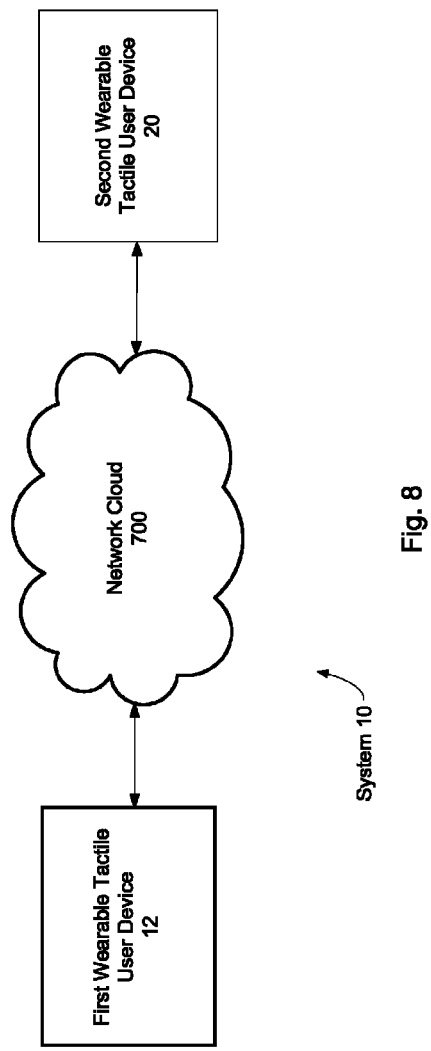
FIG. 8 schematically illustrates a fourth implementation of the system for sending tactile messages between users.

FIG. 8 describes a third alternate configuration of system 10. In this configuration the functionality provided by a server may be implemented by network cloud 700 and first wearable tactile user device 12 and second wearable tactile user device 20 communicate through network cloud 700. The functionality provided by wireless client 14 and/or wireless client 18 shown in FIG. 1 is performed by first wearable tactile user device 12, network cloud 700, and/or second wearable tactile user device 20 in this configuration.

Figure 9:
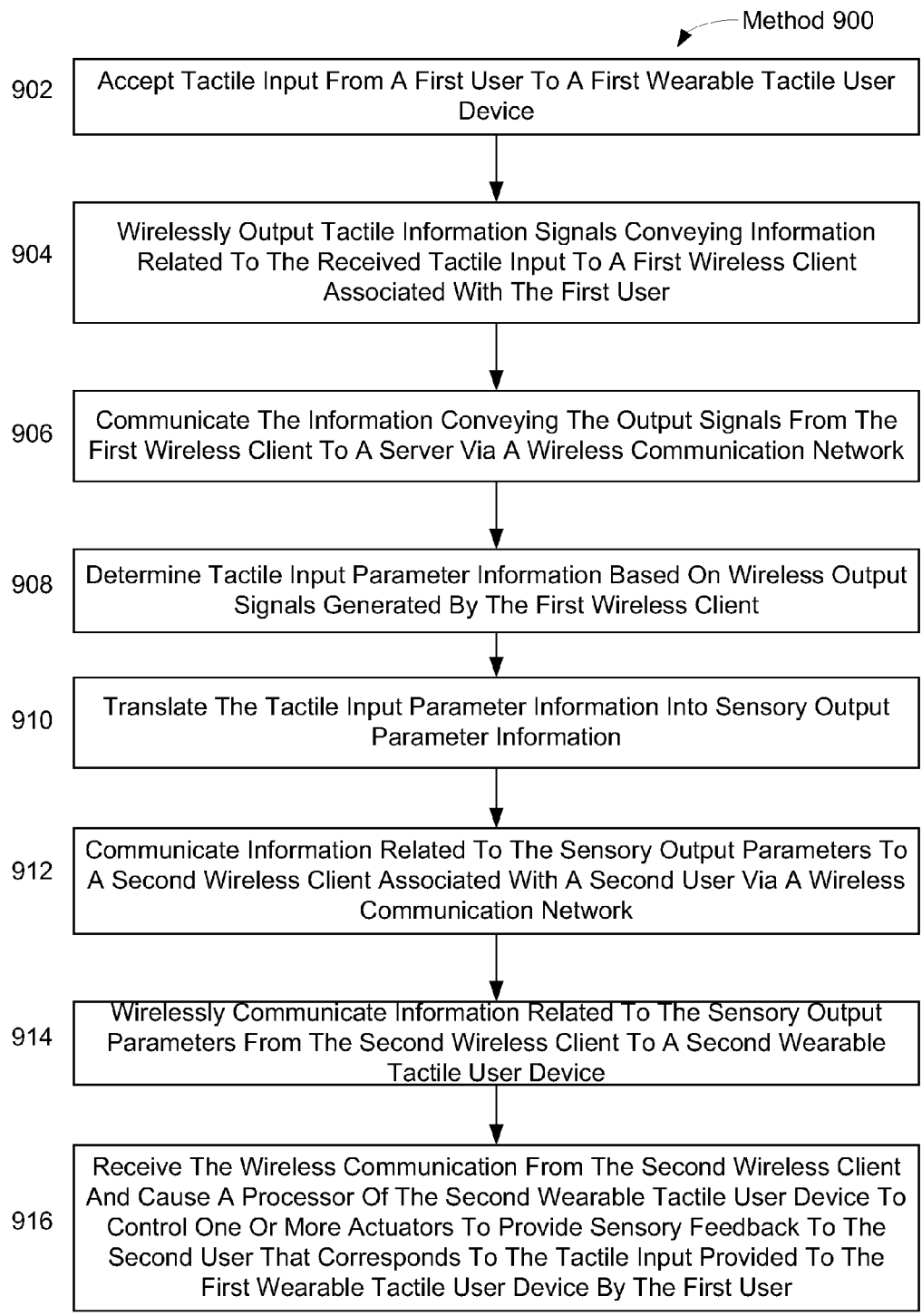
FIG. 9 is a method of sending tactile messages between users.
Figure 10:
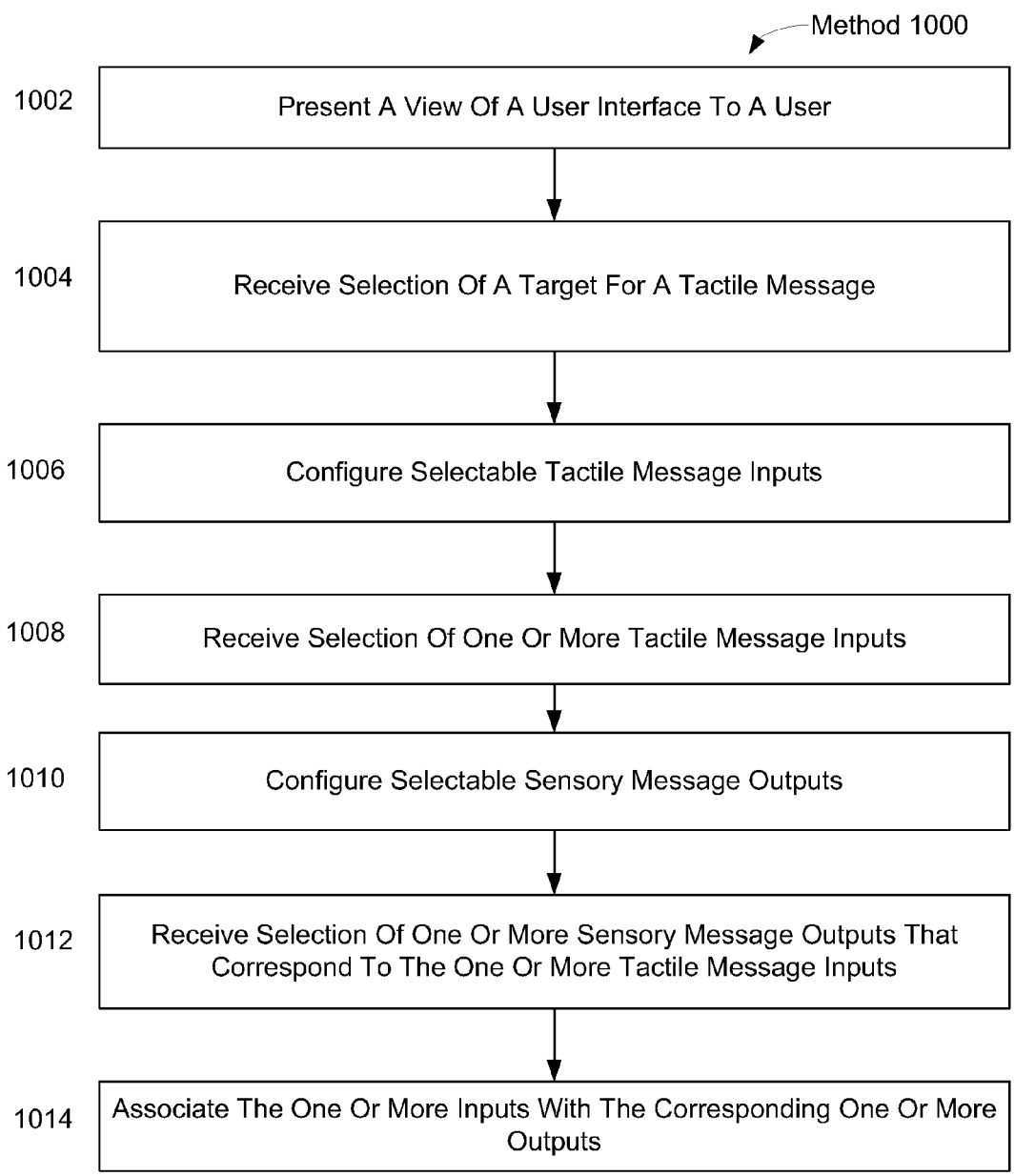
FIG. 10 is a method of configuring the tactile message by a sender.
Figure 11:
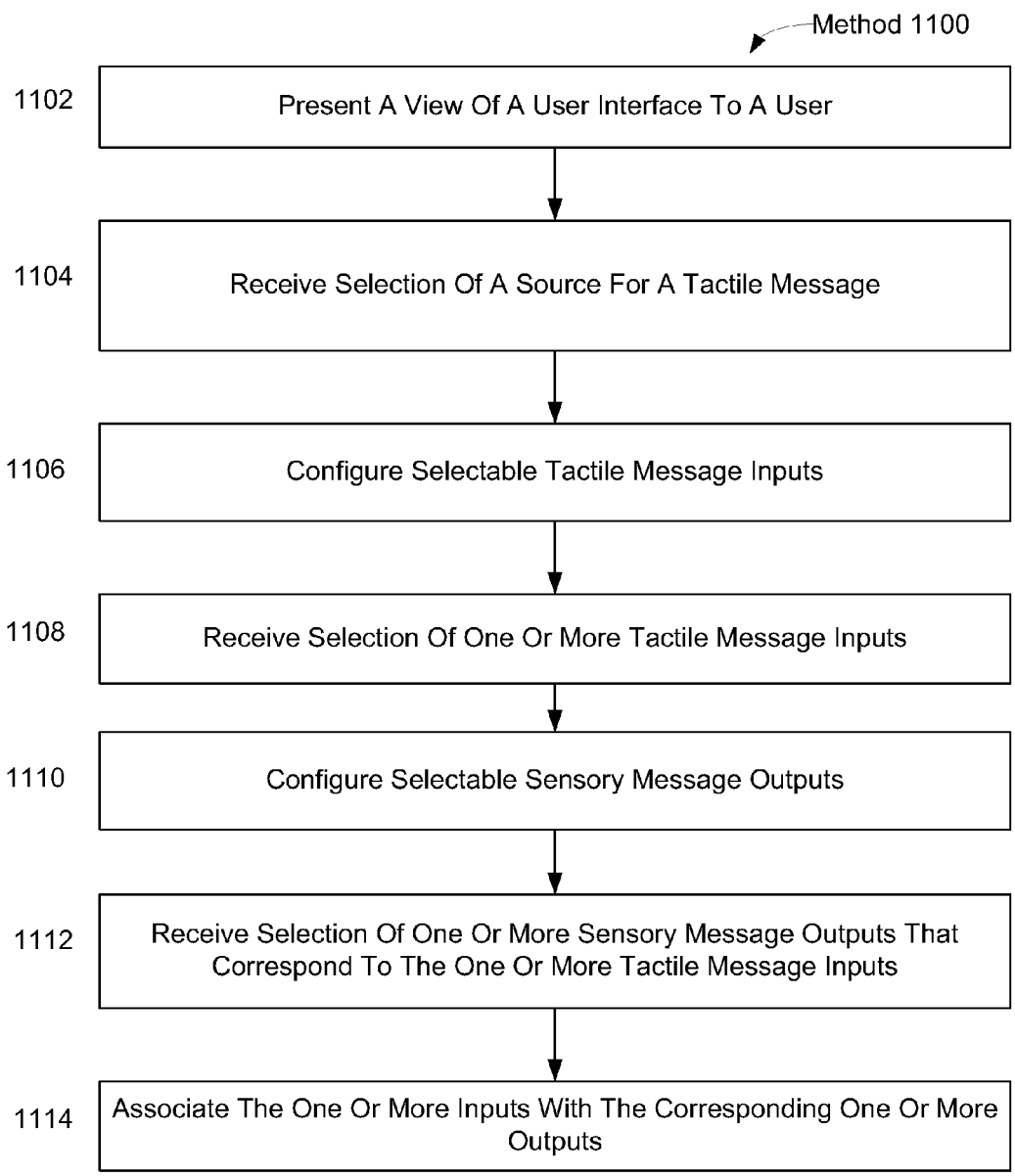
FIG. 11 is a method of configuring the tactile message by a recipient.

FIG. 9 illustrates a method 900 of sending a tactile message between users. FIG. 10 illustrates a method 1000 of tactile message configuration by a tactile message sender. FIG. 11 illustrates a method 1100 of tactile message configuration by a recipient of a tactile message. The operations of methods 900, 1000, and/or 1100 presented below are intended to be illustrative. In some implementations, methods 900, 1000, and/or 1100 may be accomplished with one or more additional operations not described, and/or without one or more of the operations discussed. Additionally, the order in which the operations of methods 900, 1000, and/or 1100 are illustrated in FIG. 9, FIG. 10, and/or FIG. 11 and described below is not intended to be limiting.

In some implementations, methods 900, 1000, and/or 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900, 1000, and/or 1100 in response to instructions stored electronically on one or more electronic storage mediums. The one or more processing devices may include one or more devices configured through hardware, firmware, and/or software to be specifically designed for execution of one or more of the operations of methods 900, 1000, and/or 1100.

Referring to FIG. 9, at an operation 902 of method 900, tactile input from a user may be accepted by a first wearable tactile user device. In some implementations, operation 902 may be performed by a first wearable tactile user device the same as or similar to first wearable tactile user device 12 (shown in FIG. 1 and described herein).

At an operation 904, tactile information signals conveying information related to the received tactile input are output to a first wireless client associated with the first user. Such communication between the first wearable tactile user device and the first wireless client may include the output signals and/or information determined therefrom. In some implementations, operation 904 may be performed by a processor the same as or similar to processor 26 (shown in FIG. 1 and described herein).

At an operation 906, the information conveying the output signals is communicated from the first wireless client to a server via a wireless communication network. Such communication may include the output signals from the first wearable tactile user device and/or information derived therefrom. In some implementations, operation 906 may be performed by a wireless client the same as or similar to wireless client 14 (shown in FIG. 1 and described herein).

At an operation 908, tactile input parameter information is determined based on the wireless output signals generated by the first wireless client. In some implementations, operation 908 may be performed by a processor module the same as or similar to tactile input parameter module 60 (shown in FIG. 1 and described herein).

At an operation 910, tactile input parameter information may be translated into sensory output parameter information. In some implementations, operation 910 may be performed by a server processor module the same as or similar to translation module 62 (shown in FIG. 1 and described herein).

At an operation 912, information related to sensory output parameters is communicated to a second wireless client associated with a second user via a wireless communication network. In some implementations, operation 912 may be performed by a processor the same as or similar to processor 76 (shown in FIG. 1 and described herein).

At an operation 914, information related to the sensory output parameters is communicated from the second wireless client to a second wearable tactile user device. In some implementations, operation 914 may be performed by a wireless client the same as or similar to wireless client 18 (shown in FIG. 1 and described herein).

At an operation 916, the wireless communication from the second wireless client is received and causes a processor of the second wearable tactile user device to control one or more actuators to provide sensory feedback to the second user that corresponds to the tactile input provided to the first wearable tactile user device by the first user. In some implementations, operation 916 may be performed by a wearable tactile user device the same as or similar to wearable tactile user device 20 (shown in FIG. 1 and described herein).

Referring to FIG. 10, at an operation 1002 of method 1000, a view of a user interface may be presented to a user. In some implementations, operation 1002 may be performed by a user interface the same as or similar to user interface 52 (shown in FIG. 1 and described herein).

At an operation 1004, selection of a target for a tactile message may be received. In some implementations, operation 1004 may be performed by a user interface the same as or similar to user interface 52 (shown in FIG. 1 and described herein).

At an operation 1006, selectable tactile message inputs may be configured. In some implementations, operation 1006 may be performed by a processor module the same as or similar to user interface module 72 (shown in FIG. 1 and described herein).

At an operation 1008, selection of one or more tactile message inputs may be received. In some implementations, operation 1008 may be performed by a user interface the same as or similar to user interface 52 (shown in FIG. 1 and described herein).

At an operation 1010, selectable sensory message outputs may be configured. In some implementations, operation 1010 may be performed by a processor module the same as or similar to user interface module 72 (shown in FIG. 1 and described herein).

At an operation 1012, selection of one or more sensory message outputs that correspond to the one or more tactile message inputs may be received. In some implementations, operation 1012 may be performed by a user interface the same as or similar to user interface 52 (shown in FIG. 1 and described herein).

At an operation 1014, the one or more inputs are associated with the corresponding one or more outputs. In some implementations, operation 1010 may be performed by one or more processor modules the same as or similar to translation module 62 and/or user interface module 72 (shown in FIG. 1 and described herein).

Referring to FIG. 11, at an operation 1102 of method 1100, a view of a user interface may be presented to a user. In some implementations, operation 1102 may be performed by a user interface the same as or similar to user interface 82 (shown in FIG. 1 and described herein).

At an operation 1104, selection of a source for a tactile message may be received. In some implementations, operation 1104 may be performed by a user interface the same as or similar to user interface 82 (shown in FIG. 1 and described herein).

At an operation 1106, selectable tactile message inputs may be configured. In some implementations, operation 1106 may be performed by a processor module the same as or similar to user interface module 72 (shown in FIG. 1 and described herein).

At an operation 1108, selection of one or more tactile message inputs may be received. In some implementations, operation 1108 may be performed by a user interface the same as or similar to user interface 82 (shown in FIG. 1 and described herein).

At an operation 1110, selectable sensory message outputs may be configured. In some implementations, operation 1110 may be performed by a processor module the same as or similar to user interface module 72 (shown in FIG. 1 and described herein).

At an operation 1112, selection of one or more sensory message outputs that correspond to the one or more tactile message inputs may be received. In some implementations, operation 1112 may be performed by a user interface the same as or similar to user interface 82 (shown in FIG. 1 and described herein).

At an operation 1114, the one or more inputs are associated with the corresponding one or more outputs. In some implementations, operation 1110 may be performed by one or more processor modules the same as or similar to translation module 62 and/or user interface module 72 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A tactile messaging system configured to send tactile messages between users, the tactile messaging system comprising:
    a first wearable tactile user device configured to accept tactile input from a first user and to wirelessly output tactile information signals conveying information related to the received tactile input;
    a server configured to receive the tactile information signals generated by the first wearable tactile user device, the server being located remotely from the first wearable tactile user device, the server being further configured to receive the tactile information signals via a network, the server including one or more first processors, the one or more first processors configured to execute computer program modules, the computer program modules comprising:
- a tactile input parameter module configured to determine tactile input parameter information based on the received tactile information signals;
- a translation module configured to determine tactile output parameter information based on the tactile input parameter information; and
- a communication module configured to cause the tactile output parameter information to be wirelessly transmitted to a second wearable tactile user device associated with a second user via the network, the second wearable tactile user device being located remotely from the server; and the second wearable tactile user device comprising:
- one or more actuators configured to provide tactile feedback to the second user wearing the second tactile user device, and
- one or more second processors configured to control the one or more actuators to provide tactile feedback to the second user that corresponds to the tactile output parameter information.

2. The system of claim 1, wherein the translation module is configured to determine the tactile output parameter information based on associations between the tactile input parameter information and the tactile output parameter information.

3. The system of claim 2, wherein the associations between the tactile output parameter information and the tactile input parameter information are configurable by a user.

4. The system of claim 3, wherein the computer program modules further comprise a user interface module configured to receive entry and/or selection by the first and/or second user of the associations between the input parameter information and the output parameter information.

5. The system of claim 2, wherein the associations between the tactile output parameter information and the tactile input parameter information change based on one or more of a source of the tactile message, or a target of the tactile message.

6. The system of claim 1, wherein the computer program modules further comprise an output target module configured to determine one or more targets for delivery of a tactile message, the determination based on one or more of a location, pressure, or timing of the tactile input by the first user on the first wearable tactile user device, and wherein the wireless transmission is responsive to a determination by the output target module that the second user is a target of the tactile message from the first user.

7. The system of claim 1, wherein the tactile input parameter information defines one or more of a first location, first timing, or first pressure on the first wearable tactile user device, and wherein the tactile output parameter information defines one or more of a second location, second timing, or second pressure of the tactile feedback provided to the second user.

* * * * *